US006151591A

United States Patent [19]
Pierce et al.

[11] Patent Number: 6,151,591

[45] Date of Patent: Nov. 21, 2000

[54] POSTAGE METERING NETWORK SYSTEM WITH VIRTUAL METER MODE

[75] Inventors: Perry A. Pierce, Darien; Charles R. Malandra, Jr., Monroe, both of Conn.

[73] Assignee: Pitney Bowes Inc., Stamford, Conn.

[21] Appl. No.: 08/993,311

[22] Filed: Dec. 18, 1997

[51] Int. Cl.$^{7}$ .......... G06F 17/00

[52] U.S. Cl. .......... 705/401; 705/410

[58] Field of Search .......... 705/400, 401, 705/403, 410; 395/200.3, 200.33, 200.47, 200.48, 200.49; 709/200, 203, 217, 218

[56] References Cited

U.S. PATENT DOCUMENTS

| | | | |
|---|---|---|---|
| 4,447,890 | 5/1984 | Duwel et al. | 705/403 |
| 4,725,718 | 2/1988 | Sansone et al. | 235/495 |
| 4,743,747 | 5/1988 | Fougere et al. | 235/494 |
| 4,757,537 | 7/1988 | Edelmann et al. | 380/51 |
| 4,760,532 | 7/1988 | Sansone et al. | 705/403 |
| 4,775,246 | 10/1988 | Edelmann et al. | 705/62 |
| 4,802,218 | 1/1989 | Wright et al. | 705/60 |
| 4,812,994 | 3/1989 | Taylor et al. | 705/410 |
| 4,831,555 | 5/1989 | Sansone et al. | 358/1.14 |
| 4,837,701 | 6/1989 | Sansone et al. | 705/404 |
| 4,853,865 | 8/1989 | Sansone et al. | 705/408 |
| 4,853,961 | 8/1989 | Pastor | 713/176 |
| 4,873,645 | 10/1989 | Hunter et al. | 700/231 |
| 5,142,577 | 8/1992 | Pastor | 705/62 |
| 5,377,268 | 12/1994 | Hunter | 705/63 |
| 5,448,641 | 9/1995 | Pintsov et al. | 380/51 |
| 5,454,038 | 9/1995 | Cordery et al. | 705/60 |
| 5,510,992 | 4/1996 | Kara | 705/408 |
| 5,606,507 | 2/1997 | Kara | 705/408 |
| 5,666,421 | 9/1997 | Pastor et al. | 380/51 |
| 5,682,318 | 10/1997 | Kara | 705/402 |
| 5,682,427 | 10/1997 | Seestrom | 380/51 |
| 5,717,597 | 2/1998 | Kara | 705/408 |
| 5,742,683 | 4/1998 | Lee et al. | 705/60 |
| 5,781,438 | 7/1998 | Lee et al. | 705/404 |
| 5,793,867 | 8/1998 | Cordery et al. | 705/60 |
| 5,802,175 | 9/1998 | Kara | 380/277 |
| 5,812,991 | 9/1998 | Kara | 705/410 |
| 5,819,240 | 10/1998 | Kara | 705/408 |
| 5,822,738 | 10/1998 | Shah et al. | 705/410 |
| 5,822,739 | 10/1998 | Kara | 705/410 |

FOREIGN PATENT DOCUMENTS 11288474 10/1999 Japan .

OTHER PUBLICATIONS

McKenna, Patrick; "Tests for PC Postage Scheduled for mid '97"; May 1997; DialogWeb copy, pp. 1–2.

*Primary Examiner*—Emanuel Todd Voeltz
*Assistant Examiner*—Thomas A. Dixon
*Attorney, Agent, or Firm*—Charles R. Malandra, Jr.; Michael E. Melton

[57] ABSTRACT

A system and method for postage metering provides a plurality of client modules on a network. A local postage security device (PSD) is coupled to a first one of the client modules and a remote PSD is coupled to a second one of the client modules. The local and remote PSDs include respectively first and second unique identification, postal value storage and digital signature generator. The first client module is connected to a remote data center that includes third unique identification, third postal value storage and a third digital signature generator. The first client module selectively requests one of a first evidence of postage payment from the local PSD, a second, evidence of postage payment from the remote PSD and a third evidence of postage payment from the data center. The first client module includes a printer for printing the selected one of the first, second and third evidences of postage payment on a mailpiece.

25 Claims, 8 Drawing Sheets

POSTAGE METERING NETWORK SYSTEM WITH VIRTUAL METER MODE

RELATED APPLICATIONS

The present application is related to the following U.S. patent applications Ser. Nos. 08/993,352, 08/993,353, 08/993,354, now U.S. Pat. No. 6,085,181, 08/993,355, 09/993,356, now U.S. Pat. Nos. 6,081,795 08/993,357, all filed concurrently herewith and assigned to the assignee of the present invention.

FIELD OF THE INVENTION

The present invention relates generally to a postage metering system and method for printing postage indicia using a personal computer and, more particularly, to a postage metering system and method for printing postage indicia in a network of personal computers.

BACKGROUND OF THE INVENTION

The Information-Based Indicia Program ("IBIP") is a distributed trusted system proposed by the United States Postal Service ("USPS") to retrofit and augment existing postage meters using new technology known as information-based indicia. The program relies on digital signature techniques to produce for each envelope an indicium whose origin cannot be repudiated and content cannot be modified. IBIP is expected to support new methods of applying postage in addition to the current approach, which typically relies on a postage meter to mechanically print indicia on mailpieces. IBIP requires printing a large, high density, two-dimensional ("2-D") bar code on a mailpiece. The 2-D bar code encodes information and is signed with a digital signature.

The USPS has published draft specifications for IBIP. The INFORMATION BASED INDICIA PROGRAM (IBIP) INDICIUM SPECIFICATION, dated Jun. 13, 1996, and revised Jul. 23, 1997, ("IBIP Indicium Specification") defines the proposed requirements for a new indicium that will be applied to mail being processed using IBIP. The INFORMATION BASED INDICIA PROGRAM POSTAL SECURITY DEVICE SPECIFICATION, dated Jun. 13, 1996, and revised Jul. 23, 1997, ("IBIP PSD Specification") defines the proposed requirements for a Postal Security Device ("PSD") that will provide security services to support the creation of a new "information based" postage postmark or indicium that will be applied to mail being processed using IBIP. The INFORMATION BASED INDICIA PROGRAM HOST SYSTEM SPECIFICATION, dated Oct. 9, 1996, defines the proposed requirements for a host system element of IBIP ("IBIP Host Specification"). The specifications are collectively referred to herein as the "IBIP Specifications". IBIP includes interfacing user (user), postal and vendor infrastructures which are the system elements of the program. The INFORMATION BASED INDICIA PROGRAM KEY MANAGEMENT PLAN SPECIFICATION, dated Apr. 25, 1997, defines the generation, distribution, use and replacement of the cryptographic keys used by the USPS product/service provider and PSDs ("IBIP KMS Specification").

The user infrastructure, which resides at the user's site, comprises a PSD coupled to a host system ("Host") with printer. The PSD is a secure processor-based accounting device that dispenses and accounts for postal value stored therein.

The IBIP Indicium Specification provides requirements for the indicium that consists of both human-readable data and PDF417 bar code data. The human-readable information includes an originating address, including the 5-digit ZIP Code of the licensing post office, PSD ID/Type number, date of mailing and amount of the applied postage. The bar code region of the indicium elements includes postage amount, PSD ID, user ID, date of mailing, originating address, destination delivery point identification, ascending and descending registers and a digital signature.

An integrated mailing system is subject to open system requirements if it includes a computer interfaced to the meter and it prepares mailpiece fronts or labels that include both the destination address and the indicium. The integrated system is an open system even if different printers apply the address and the indicium. If the mailing system satisfies such criteria, the USPS considers the "meter" to be an open system peripheral device that performs the dual functions of printing the indicia and interfacing the PSD to the Host. The integrated mailing system must be approved by the USPS according to open system criteria.

The IBIP Host Specification sets forth the requirements for a Host in an open system. The Host produces the mailpiece front including the return address (optional), the delivery address (required), the Facing Identification Mark ("FIM"), and the indicium as an integral unit. The Host may print this unit on the actual mailpiece stock or label(s) for later attachment to the mailpiece. The Host provides the user with an option to omit the FIM (e.g., when the FIM is preprinted on envelopes). The Host produces standardized addresses, including standard POSTNET delivery point bar code, for use on the mailpiece. The Host verifies each address at the time of mailpiece creation. The Host then creates the indicium and transmits it to the printer.

The IBIP Specifications define a stand-alone open metering system, referred to herein as a PC Meter or Stand-alone PC Meter. The Stand-alone PC meter has one personal computer ("PC") which operates as the Host ("Host PC"). The Host PC runs the metering application software and associated libraries (collectively referred to herein as "Host Applications" and "PC Meter Toolkit") and communicates with one or more attached PSDs. The Stand-alone PC Meter can only access PSDs coupled to the Host PC. There is no remote PSD access for the Stand-alone PC Meter.

The Stand-alone PC Meter processes transactions for dispensing postage, registration, and refill on the Host PC. Processing is performed locally between the Host and the PSD coupled thereto. Connections to a Data Center, for example for registration and refill transactions, are made locally from the Host through a local or network modem/internet connection. Accounting for debits and credits to the PSD are also performed locally, logging the transactions on the Host PC, which is the PC where the transactions are processed on and to which the PSD is attached. Thus, the accounting of funds and transaction processing are centralized on a single PC. The Host PC may accommodate more than one PSD, for example supporting one PSD per serial port. Several applications programs running on the Host PC, such as a word processor or an envelope designer, may access the Host Applications.

The IBIP Specifications do not address an IBIP open metering system on a network environment. However, the specifications do not prohibit such a network-based system. Generally, in a network environment a network Server PC controls remote printing requested by a Client PC on the network. Of course, the Client PC controls any local printing.

One version of a network metering system, referred to herein as a "Virtual Meter", has many Host PCs without any PSDs coupled thereto. The Host PCs run client applications, but all PSD functions are performed on Server(s) located at a Data Center. The PSD functions at the Data Center may be performed in a secure device attached to a computer at the Data Center, or may be performed in the computer itself. The Host PCs must connect with the Data Center to process transactions such as postage dispensing, meter registration, or meter refills. Transactions are requested by the Host PC and sent to the Data Center for remote processing. The transactions are processed centrally at the Data Center and the results are returned to the Host PC. Accounting for funds and transaction processing are centralized at the Data Center. See, for example, U.S. Pat. No. 5,454,038, which is assigned to the assignee of the present invention. The Virtual Meter does not conform to all the current requirements of the IBIP Specifications. In particular, the IBIP Specifications do not permit PSD functions to be performed at the Data Center.

SUMMARY OF THE INVENTION

It has been found that an open metering system, which conforms to the IBIP Specifications, can be implemented on a conventional local, or wide area network to form a "Network PC Metering System". The Network PC Metering System includes a plurality of Client PCs operatively coupled to a Network Server PC as part of a conventional network. The Network PC Metering System is configured with at least one PSD coupled to at least one of the Client PCs, whereby authorized ones of the other Client PCs on the network can obtain postage value from a PSD that is remote from the requesting Client PC. Any Client PC may have one or more PSDs attached thereto. Each Client PC has access, if authorized, to both its own local PSD(s), if any, and any other Client PC's PSD(s) ("remote PSDs") in the network.

Each Client PC runs its own client metering application to dispense postage and to perform registration and refill operations. For each PSD in the Network PC Metering System, the Client PC to which the PSD is coupled controls processing transactions for dispensing postage and registration and refill of the PSD. When performing such operations, the Client PC functions as a server for the metering transaction, and is referred to herein as a "Meter Server PC". In a preferred embodiment of the Network PC Metering System the accounting for debits and credits to the PSD and the logging of transactions are performed on the Meter Server PC. Thus, the transaction processing is performed remotely when a Client PC is accessing a remote PSD. In alternate embodiments, the logging of transactions is performed on a network server to which the Client PCs are connected ("Network Server PC").

In the preferred embodiment, modems or internet connections for accessing the Data Center are located in the Meter Server PC. In alternate embodiments, the modem may be located in the PSD or the Client PC and the Internet connection may be in the Client PC.

It has also been found that the Network PC Metering System can be configured such that each Client PC dynamically knows which remote PSDs are available for use by such Client PC, and that each Meter Server PC, i.e., each Client PC with a PSD coupled thereto, dynamically knows which Client PCs are on-line that are authorized to use the PSD coupled to the Meter Server PC.

There are several benefits that are realized from the present invention. One such benefit relates to the postal regulations requiring that the postage printed on a metered mailpiece must be obtained from a meter licensed from the local post office at which the mailpiece is deposited for mailing, commonly referred to as "origin of deposit" or "domain". With a plurality of PSDs accessible over a computer network a user at a Client PC is not limited to a single PSD having a single origin of deposit or domain. For example, while most users of a network metering system located in Shelton, Conn. may be willing to deposit their mailpieces in the Post Office in Shelton, Conn., other users may intend to deposit their mailpieces at different origins of deposit, such as Stamford, Conn. Furthermore, some of the users may be at a Client PC that is physically located in Stamford, Conn. but is connected to a network server physically located in Shelton Conn.. The present invention provides each user of a Client PC on the network with access to several PSDs having different origins of deposit.

Another benefit of the present invention is that mailpiece generation does not have to be interrupted because of PSD funds limitation. For example, when a large mail run requires more postal value than is stored on a single PSD, the user can access another PSD on the network to complete the mail run without having to interrupt the mail run to refill the PSD that is low on funds.

Yet another benefit of the present invention is the ability to also access a "virtual" PSD at a Data Center for postal funds for another domain. The best example of this is a user that is located in one country, such as the United States, wanting to prepare mailpieces that will be mailed in another country, such as Canada. It is well known that postal regulations do not permit a postage meter for the other country to be present in a foreign country. However, under the present invention, the user located in, for example, in Buffalo, N.Y., may prepare and meter mailpieces that will be deposited for mailing in Canada by accessing a PSD located in Canada and then shipping the mailpieces to Canada for deposit at a Canadian Post Office. This allows the user in Buffalo to pay domestic Canadian postage rates instead of U.S. international rates to Canada.

The present invention provides a postage metering system and method for postage metering provides a plurality of client modules on a network. A local postage security device (PSD) is coupled to a first one of the client modules and a remote PSD is coupled to a second one of the client modules. The local and remote PSDs include respectively first and second unique identification, postal value storage and digital signature generator. The first client module is connected to a remote data center that includes third unique identification, third postal value storage and a third digital signature generator. The first client module selectively requests one of a first evidence of postage payment from the local PSD, a second evidence of postage payment from the remote PSD and a third evidence of postage payment from the data center. The first client module includes a printer for printing the selected one of the first, second and third evidences of postage payment on a mailpiece.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
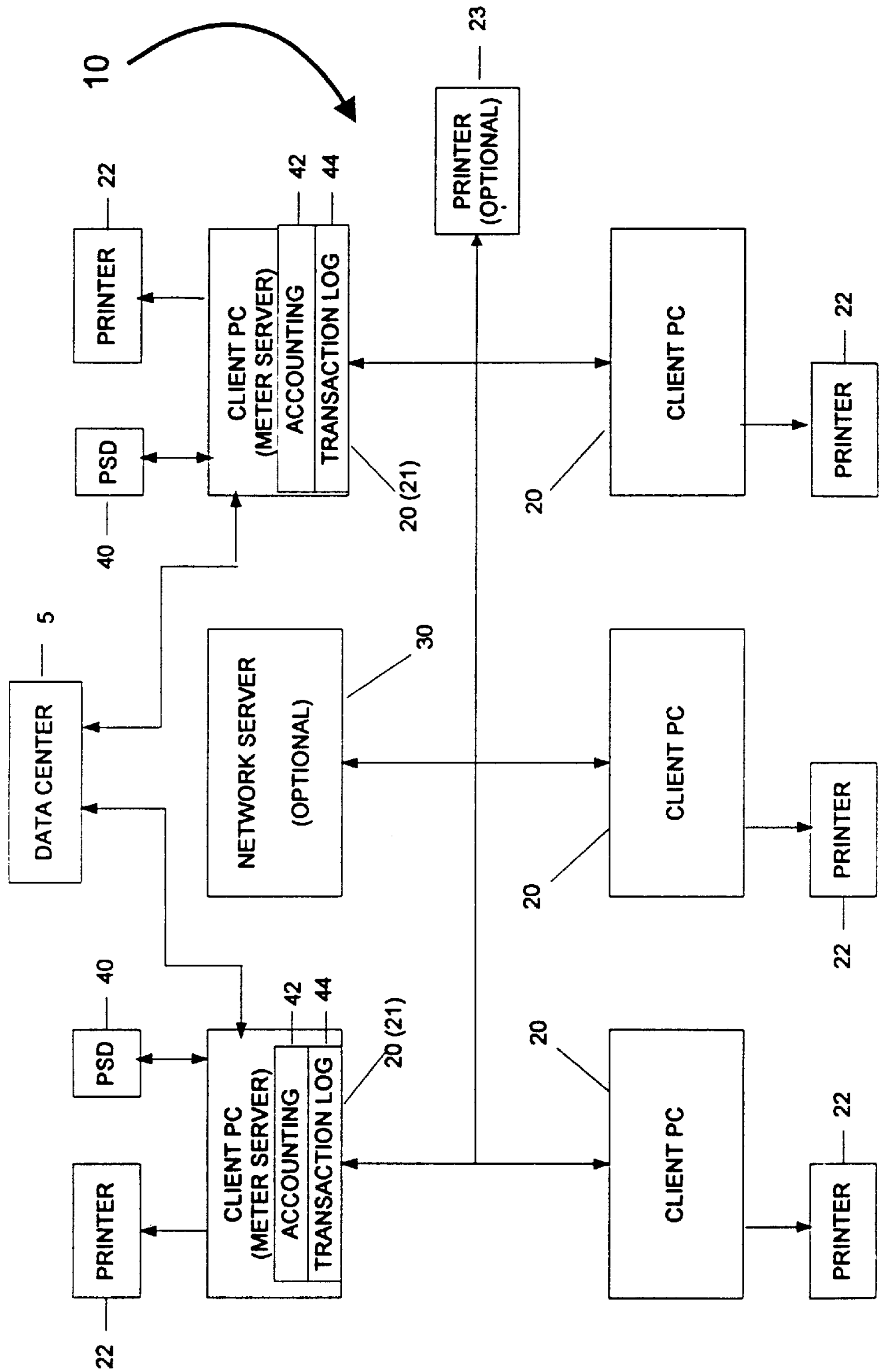
FIG. 1 is a block diagram of a preferred embodiment of a Network PC Metering System with PSDs couple to Client PCs in accordance with the preferred embodiment of the present invention.

In describing the present invention, reference is made to the drawings, wherein there is seen in FIGS. 1–2, alternate embodiments of a Network PC Metering System. FIG. 1 shows the preferred embodiment of the present invention. A Network PC Metering System, generally designated 10, includes a plurality (five are shown) of Client PCs 20 conventionally coupled to a Network Server 30. Each PSD 40 (two are shown) of Network PC Metering System 10 is coupled to one of Client PCs 20. Each Client PC includes a conventional personal computer system with display, keyboard, and an unsecured printer 22. (Optionally, each Client PC may access a network printer 23 connected directly to the network.) Preferably, a plurality of PSDs exists in Network PC Metering System 10, with at least one PSD 40 being coupled to several Client PCs 20. When a specific PSD 40 is accessed for a metering transaction, Client PC 20, to which the PSD 40 is attached, becomes a Meter Server PC 21 (shown within parenthesis) for the remainder of the transaction. When the PSD 40 is being accessed by the Client PC 20 to which the PSD is coupled the Client PC 20 is functioning as a stand-alone PC meter. An example of a stand-alone PC metering system is described in U.S. patent application Ser. No. 08/575,112, filed Dec. 19, 1995, which is incorporated herein in its entirety by reference.

Client PCs 20 communicate with Data Center 5 to perform postage refilling to local PSDs 40 or to access virtual PSD funds as described below.

In the preferred embodiment, the postal funds accounting and the transaction processing occur in the Meter Server PC 21. It will be understood that this is a decentralized approach concerning funds accounting and transaction accounting because each Client PC 20 having a PSD 40 attached thereto maintains accounting information (departmental accounting registers 42) and transaction information (transaction logs 44) relating to transactions occurring only at its PSD 40.

Figure 2A:
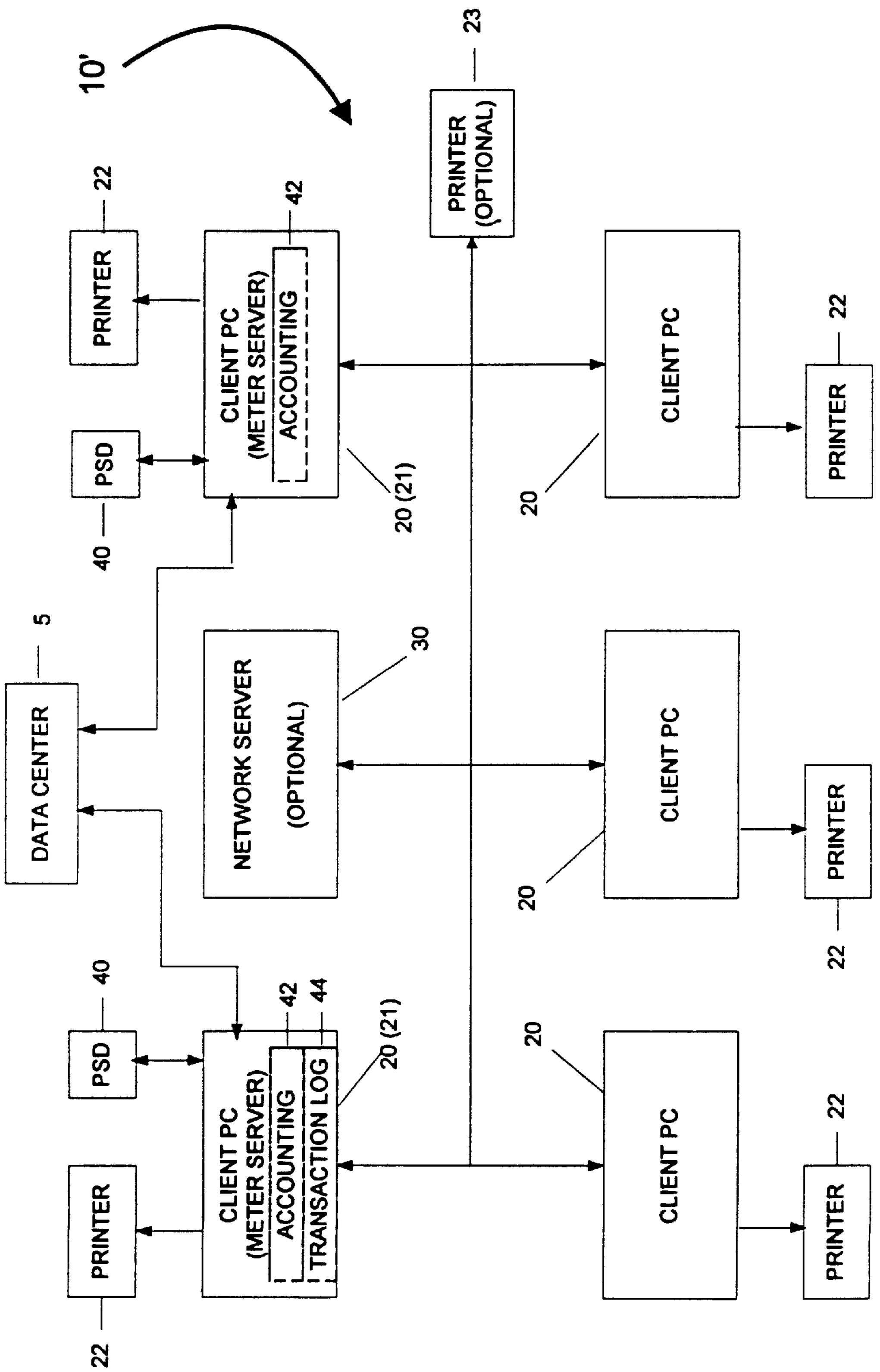
FIGS. 2 (2A and 2B) are block diagrams of alternate embodiments of a Network PC Metering System with PSDs couple to Client PCs with a centralized transaction log.
Figure 2B:
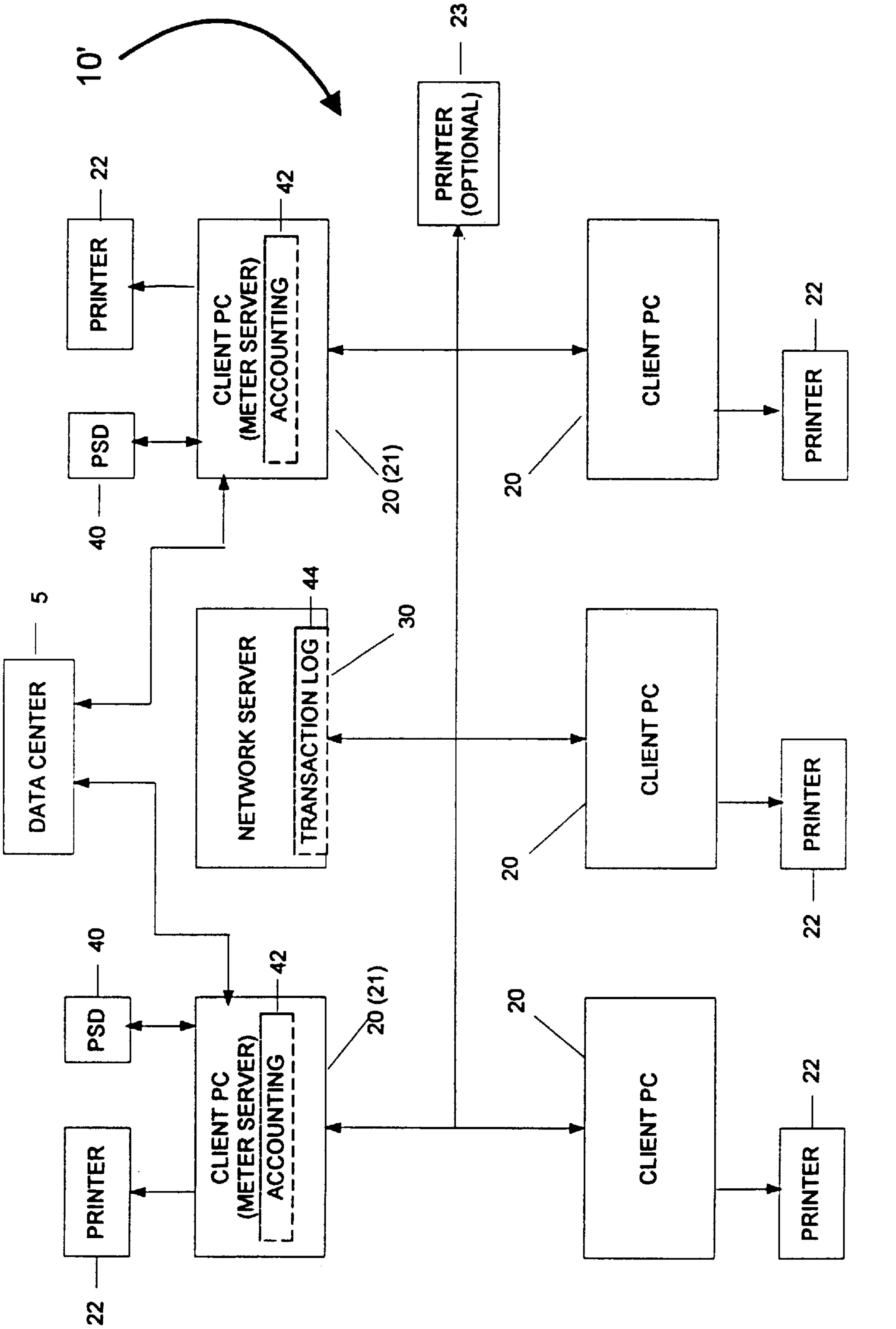
Figure 4:
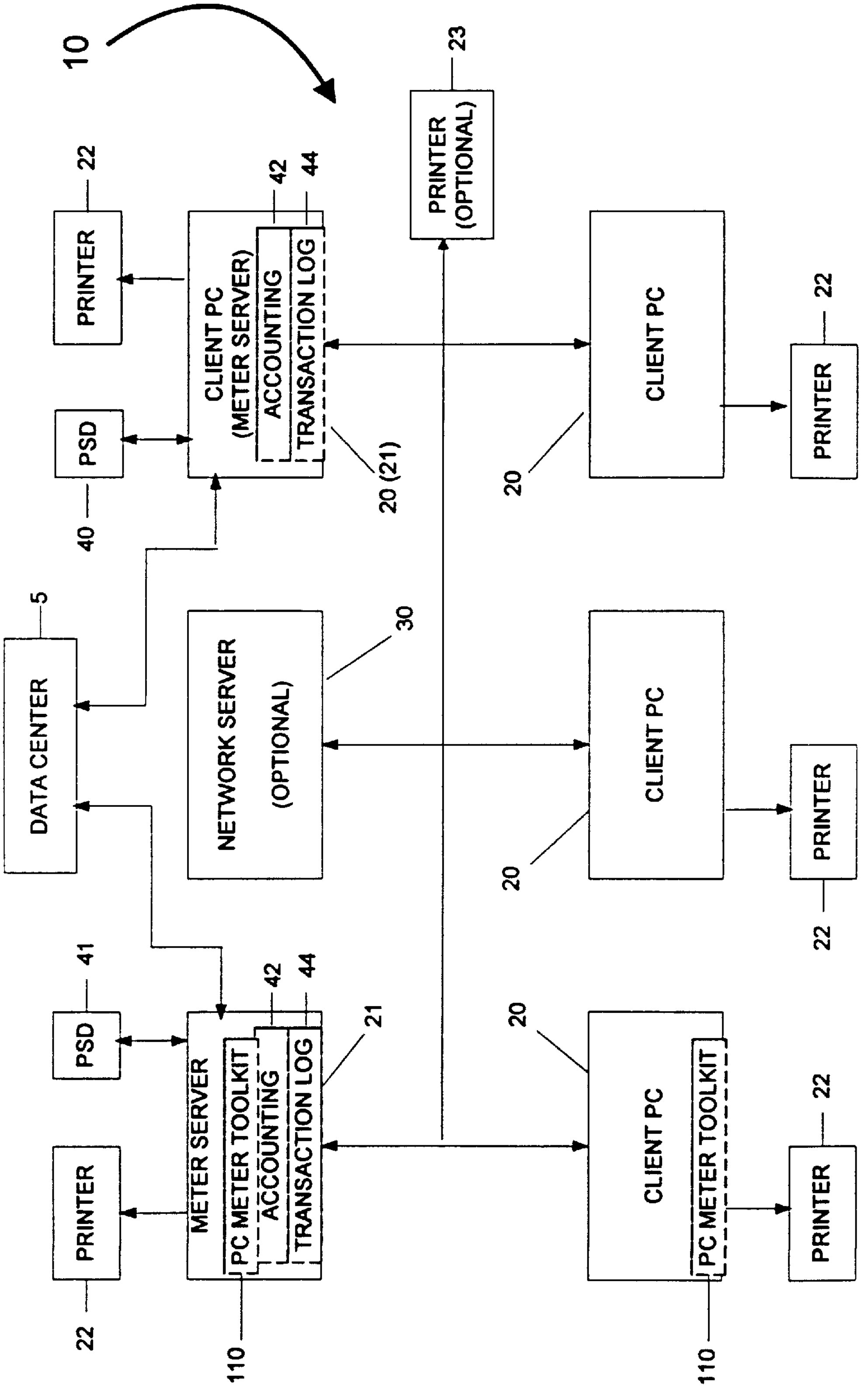
FIG. 4 is a block diagram of the preferred embodiment of a Network PC Metering System of FIG. 1 with a Client PC in Meter Server mode.

FIGS. 2A and 2B show alternate embodiments of the present invention. Network PC Metering System, generally designated 10', includes a plurality (five are shown) of Client PCs 20 conventionally coupled to a network server 30. Each PSD 40 (two are shown) of Network PC Metering System 10' is coupled to one of Client PCs 20. Each Client PC includes a conventional personal computer system with display, keyboard, and an unsecured printer 22(and/or optional network printer 23). As in the preferred embodiment, a plurality of PSDs exists in Network PC Metering System 10', with at least one PSD 40 being coupled to several Client PCs 20. When the specific PSD is accessed for a metering transaction, the Client PC 20, to which the PSD 40 is attached, becomes a Meter Server PC 21 for the remainder of the transaction (FIG. 4). In this embodiment the postal funds accounting occurs in Meter Server PC 21 when the transaction has been concluded. However, the transaction processing occurs at Network Server 30. It will be understood that this is a decentralized approach concerning funds accounting because each Client PC 20 that has a PSD 40 attached thereto maintains accounting information (accounting registers 42) relating to transactions occurring only at its PSD. However, this embodiment provides a centralized approach concerning transaction accounting because one of the Meter Servers 21 (FIG. 2A) or Network Server 30 (FIG. 2B) relating to transactions occurring at any PSD.

In the case of the virtual PSD located at Data Center 5, transaction information is stored, for example by user account, for all postage transactions occurring at the virtual PSD.

Referring again to FIGS. 1 and 2, Network PC Metering Systems 10 and 10' are configured with one or more PSDs 40 coupled to one or more Client PCs 20. In such configurations, the Client PC 20 becomes a Stand-alone PC Meter when a metering transaction is processed locally on its coupled PSD 40. When operating as a Stand-alone PC Meter, such Client PC 20 performs the previously described metering transaction, acting as both the requesting Client PC and the Meter Server PC. As a Stand-alone PC Meter, Client PC 20 can only access the PSD 40 coupled to it. There is no remote vault access when a Client PC is processing a metering transaction on the local PSD.

Figure 3:
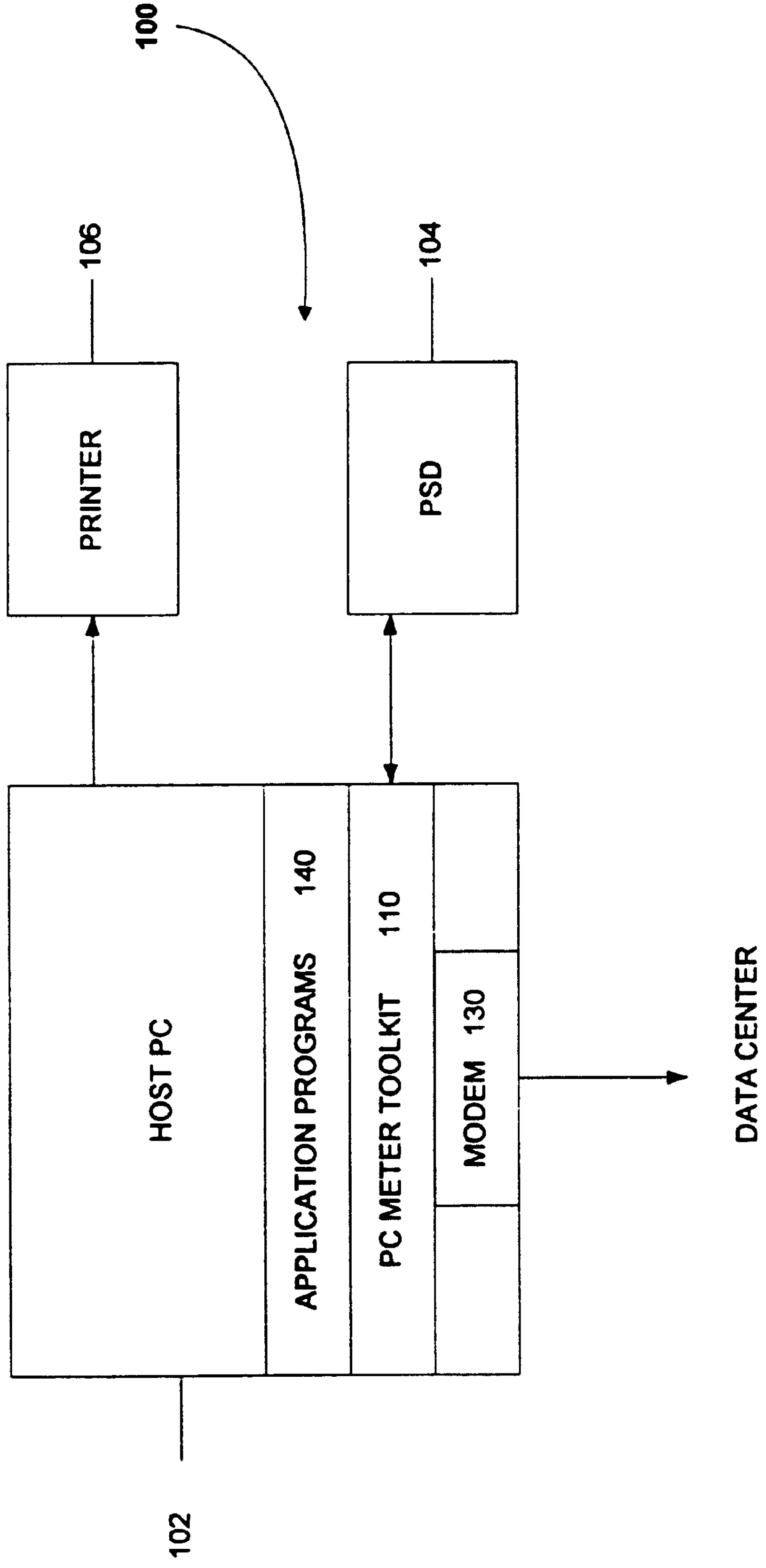
FIG. 3 is a Client PC operating in stand-alone mode.

Referring now to FIG. 3, a Client PC 20 is shown in Stand-alone PC Meter mode, generally designated 100. Stand-alone PC Meter 100 includes Host PC 102, PSD 104 and printer 106. Stand-alone PC Meter 100 processes the functions for PSD registration, PSD refill, and postage dispensing as transactions for PSD 104. Processing is performed locally by metering software component 110 (referred to herein as "PC Meter Toolkit") running in Host PC 102. In the preferred embodiment, PC Meter Toolkit is a Component Object Model/Distributed Component object Model (COM/DCOM) object (typically implemented as a dynamic link library (DLL) or OLE control) with interfaces to perform metering operations. One such interface maintains a list of local and remote PSDs on the network. This interface maintains a current list of all known and attached PSDs at the time it is instantiated. There is also a refresh method that Host and Client applications may use to update the list. An example of a PC metering system using a DLL with interfaces to perform metering operations is described in previously noted U.S. patent application Ser. No. 08/575,112, filed Dec. 19, 1995, which is incorporated herein in its entirety by reference. For additional information on COM/DCOM see technical white papers for Microsoft Windows NT® Server, including: DCOM Architecture; DCOM Technical Overview; and DCOM The Distributed Component Object Model, A business Overview; incorporated herein in their entirety by reference.

PC Meter Toolkit 110 includes the following components: a transaction handler, a vault interface, and a transaction log handler. Connections to the Data Center 5 can be made locally from the Stand-alone PC Meter 100 via modem 130. Accounting for debits and credits'to the PSD are also performed locally, logging the transactions on the hard drive of Stand-alone PC Meter 100. In this manner, the transaction processing and funds accounting are centralized on the Client PC operating as Stand-alone PC Meter 100.

Stand-alone PC Meter 100 may accommodate more than one PSD per PC, for example, supporting one vault per serial port. Several Host or client applications programs 140, such as a word processor or an envelope designer, may access the PC Meter Toolkit 110 concurrently.

The PC Meter Toolkit 110 provides standard metering functions, such as dispensing postage, PSD refills, and PSD registration. The PC Meter Toolkit 110 resides in all Meter Servers and remote Client PCs capable of printing postage. The user of Stand-alone PC Meter 100 can access local or remote PSDs using PC Meter Toolkit 110. The PC Meter Toolkit 110 provides a list of the available PSDs from which the user selects a desired PSD for a particular transaction.

The COM/DCOM network concept provides mechanisms for a remote Client PC to gain access rights to the PC Meter Toolkit component in a PC Meter Server. Optionally, every Client PC can be given access rights to the PC Meter Server, whereby the PC Meter Server's PSD PIN (password) can be used to authorize access to postage functions in the PC Meter Server and its PSD. By default, all PSDs are considered remotely accessible by all Client PCs unless configured differently by the user. Alternatively, the list of available PSDs can be customized based on user or system filters. For example, only sharing vaults whose origin zip matches the return address of the mailpiece. In the preferred embodiment, the PSD is not active during access for authorization because PIN validation is performed by the PC Meter Server. The PC Meter Server obtains the PSD PIN from the PSD to perform validation. In an alternate embodiment, the PIN validation could occur within the PSD. This is a secure process because the PIN is stored in the PSD.

During the creation of a mailpiece, the user performs the following functions whether the PC meter is operated in stand-alone mode or network mode. The user can select CD-ROM addressing or dialup addressing (at the Data Center 5) to obtain correct addressee information. The user can choose the class of mail service (rate category) for the mailpiece. The user can select from a list of rate categories that are authorized by the Post Office. The user can view an indicium on the monitor while designing the mailpiece and print preview the mailpiece with an indicium image. PC Meter Toolkit 110 provides a method to draw the indicium image and 2D bar code before printing. The indicium may be marked as visible or invisible for display purposes. See U.S. patents application Ser. No. 08/922875, entitled METHOD FOR PREVENTING FRAUDULENT PRINTING OF A POSTAGE INDICIUM DISPLAYED ON A PERSONAL COMPUTER filed Sep. 3, 1997, now U.S. Pat. No. 5,988,897 and assigned to the assignee of the present invention, which discloses a method for preventing fraudulent printing of a postage indicium displayed on a personal computer. The user can change the postage amount, class of service and date of mailing. These changes are reflected in the indicium image.

PC Meter Toolkit 110 provides postal funds security because the user can not print an indicium without accounting for a debit to the PSD. Furthermore, there is no direct access to the indicium image, except through the PC Meter Toolkit transactions. The PC Meter Toolkit uses atomic transactions to tie the debit to PSD with the enabling of printing of the indicium image. The atomic transaction ensures that the debit to the PSD is complete before printing the indicium.

The transaction log stores funds transactions for PSD dispensing and refills. For Network PC Metering System 10, each Client PC stores the daily transaction log file for its local PSD(s). The user may select the local drive and directory path for the log file. For Network PC Metering System 10', each Client PC forwards transaction information for its local PSD(s) to Network Server 30 which stores the daily transaction log file. Once the accounting for a mailpiece transaction is completed, the client application requesting the transaction spools the mail piece corresponding to the transaction to the PC print manager for printing the indicium.

Network PC Metering System (10 or 10') has many Client PC's with or without PSD(s) attached. Each Client PC has access to both its own local PSD(s) and remote PSDs in the network. Each Client PC can run its client application to dispense postage and initiate registration and refills.

As previously stated, Network PC Metering System (10 or 10') processes transactions for dispensing postage, PSD registration, and PSD refill on the Client PC 20 where the specific PSD 40 is located. This requires the transaction processing to be performed remotely if the user is accessing a remote PSD. Modems for accessing Data Center 5 are preferably located on each Client PC 20 having a PSD 40 coupled thereto. However, a single modem may be located on the Network Server 30 instead of several modems on each Client PC 20 having a PSD 40 coupled thereto. In this manner, PSD registrations, and PSD refills are processed through Network Server 30.

The software components for the Network PC Metering System (10 or 10') include the software components for the Stand-alone PC Meter along with two additional components, listed below.

Referring now to FIG. 4, a Client PC 20 enters Meter Server PC 21 mode when another Client PC 20 on the network initiates remote access of PSD 41 through its PC Meter Toolkit 110. Meter Server PC 21 processes the functions for PSD registration, PSD refill, and postage dispensing as transactions for PSD 41. Processing is performed at Meter Server PC 21 by the previously described PC Meter Toolkit 110 residing in Meter Server 21 and at Client PC 20 by the PC Meter Toolkit 110 residing in Client PC 20.

Using a DCOM implementation, the PC Meter Toolkits 110 residing in the Client PC 20 and the Meter Server 21 operate in conjunction with each other such that the remote requesting Client PC 20 and Meter Server PC 21 operate collectively as a PC meter. The PC Meter Toolkit 110 residing in Meter Server 21 handles messages from and to the requesting Client PC 20, and handles standard metering functions, such as dispensing postage, PSD refills, and PSD registration, for PSD 41 in the same manner as when in stand-alone mode.

Figure 5:
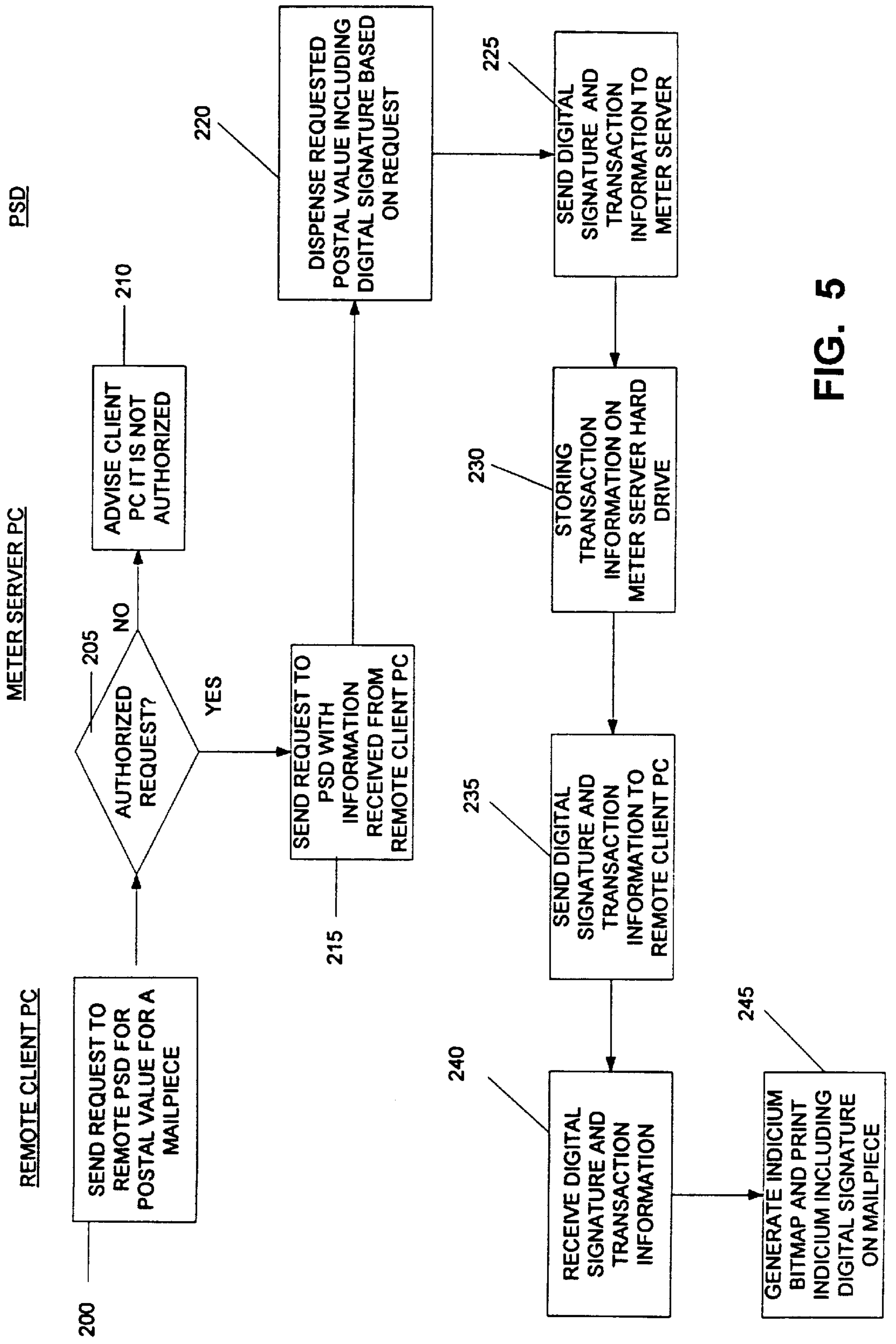
FIG. 5 is a flow chart of a Client PC accessing a remote PSD.

Referring now to FIG. 5, at step 200, Client PC 20 sends a request through its PC Meter Toolkit 110 to remote PSD 41 for postal value for a mailpiece. At step 205, Meter Server 21 determines whether the Client PC 20 is authorized to make the request. If not authorized, then at 210, Meter Server 21 responds to Client PC 20 that it is not authorized to access PSD 41. If authorized, then at step 215, Meter Server 21 processes the request through its PC Meter Toolkit 110 sends the request to PSD 41 with information received from remote Client PC 20. At step 220, PSD 41 dispenses the requested postal value including a digital signature based on the request. At step 225, PSD 41 sends the digital signature and transaction information to Meter Server 21. At step 230, Meter Server 21 through its PC Meter Toolkit 110 records the transaction information in a transaction log on its hard drive. At step 235, Meter Server 21 sends the digital signature and at least some of the transaction information to remote Client PC 20 At step 240, Client PC 20 receives the digital signature and transaction information and, at step 245, Client PC 20 generates an indicium bitmap and prints the indicium including digital signature on mailpiece.

Figure 6:
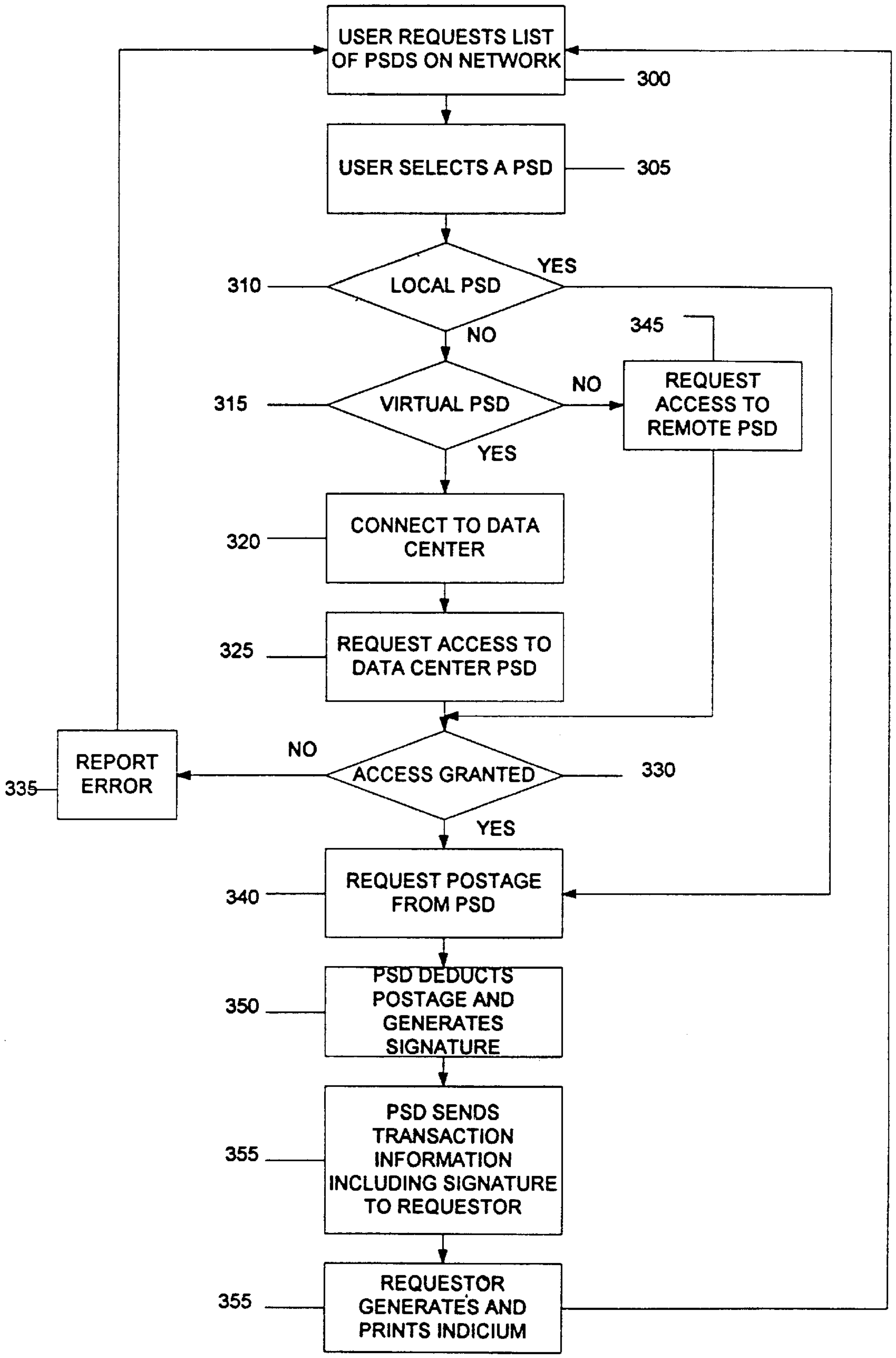
FIG. 6 is a flow chart of a Client PC operating as a Meter Server and a Stand-alone PC Meter.

Referring now to FIG. 6, the steps of the preferred embodiment of the present invention are shown. At step 300, a user at one of the Client PCs requests a list of available PSDs on the network. At step 305, the user selects a PSD from the list. If, at step 310, the selected PSD is a PSD local to the user's Client PC, then, at step 340, PC Meter Toolkit 110 in the user's Client PC requests a postal amount for a mailpiece from the local PSD, sending information to the PSD including addressee information and the process continues at step 350 below. If, at step 315 the user selected a virtual PSD, then, at step 320, PC Meter Toolkit 110 in the user's Client PC initiates a communication by the user's Client PC with the Data Center through modem 124. It will be understood that this communication may also be accomplished via another type of connection, such as direct internet connection. When a communication connection is established PC Meter Toolkit 110 in the user's Client PC requests access to the virtual PSD at the Data Center. If, at step 315, the user selected a remote PSD, then at step 345, PC Meter Toolkit 110 in the user's Client PC requests access to the selected remote PSD at one of the other Client PCs.

If, at step 330, access to the requested PSD (remote or virtual) is granted, then at step 340, the request for the postal amount is received by the requested PSD. If access is not granted then, at step 335, an error is reported.

At step 350, the accessed PSD (local, remote or virtual) deducts the requested postal amount from a total postal value stored in the PSD and generates a signature using information supplied with the request including the addressee information. At step 355, the PSD sends transaction information including the signature to the requesting Client PC. At step 360, the PC Meter Toolkit 110 of the requesting Client PC generates and prints an indicium including the signature.

It will be understood that the process of selecting a local, remote or virtual PSD may be done automatically by the PC Meter Toolkit 110 of the requesting Client PC. For example, the automatic PSD selection may be based on matching the origin zip code of the PSD to the zip code of the return address of the mailpiece.

Networked Operations

Microsoft's Windows '95™ and Windows NT™ operating systems provide facilities through DCOM and other mechanisms to implement network communications. Through the use of DCOM, objects can communicate via a mechanism referred to as connection points, which can be used to implement direct communication, multi-casting (more than one client receives messages), or broadcasting (all clients receive messages). This can be done between processes on the same computer or multiple computers on a network or on the internet. Mailslots is another Windows mechanism that permits the same communications facilities. The PC Meter Toolkit 110 uses these facilities to exchange information about the location and disposition of PSDs on the network.

When a Client PC logs into the network, the PC Meter Toolkit 110 running on the Client PC registers the necessary connection points; one common to all PC Meter Toolkits on the network, and one specific to the Client PC itself. The common connection point is used to send and receive multi-casted messages from all Clients. The specific connection point is for messages intended solely for one particular Client PC Meter Toolkit, such as a request or response for evidence of postage payment.

Upon initialization, the Client PC's PC Meter Toolkit 110 uses the common connection point to send a message for all other PC Meter Toolkits to respond with available PSDs. PC Meter Toolkits running on PC Meter Servers 21 then respond to the Client PC's specific connection point with information about the location and identities of any attached PSDs. Referring to FIG. 2A, the list of available PSDs is consolidated and presented to applications that require postage metering functions. Referring to FIG. 2B, the list of available PSDs is consolidated along with locally attached PSDs and the complete list presented to applications that require postage metering functions. In this case, the PC Meter Toolkit 110 also sends messages to the common PC Meter Toolkit connection points indicating that another PSD is available for use by other PC Meter Toolkits.

When a remote Client PC 20 selects a PSD 40 to use, the PC Meter Toolkit 110 uses the information collected at initialization to know where the particular PSD is located, and how to communicate with it.

In operation, the PC Meter Toolkit 110 also handles messages regarding the status of PC Meter Toolkits 110 on the network. Should new PC Meter Toolkits be started on other Client PCs 20, the local PC Meter Toolkit responds with information regarding any attached PSDs 40. Should messages be received indicating that a new PC Meter Client 20 has come on-line with its own PSD(s) 40, the PC Meter Toolkit updates its list of available PSDs. Similarly, if a Client PC 20 is shutting down, messages are sent to all Client PCs indicating that any local PSDs will no longer be available. It is noted that all messages between PC Meter Toolkits 110 can be encrypted for added security, particularly those between a PC Meter Toolkit 110 and Data Center 5 since it is likely to travel over a public network.

The effect of the Client PC Startup and Shutdown multicasts is that all Client PCs 20 dynamically know exactly which PSDs 40 are available. Clients also have the ability to ask explicitly for a refreshed list of available PSDs 40 since it is possible that a machine can go off-line without proper notification. DCOM also provides mechanisms for this with continual pinging to catch computers improperly notifying clients/servers.

Centralized vs. Distributed Processing On the Network

A PC Metering system must account for funds for all mail pieces and refills. This requires saving transaction records in a sequential transaction log file. Both postage dispensing and refills should be kept in the same sequential file such that meter discrepancies, such as discrepancies due to meter movement between Client PCs on the network, can be reconciled. The following paragraphs summarize the impact of using centralized vs. decentralized accounting for the transaction log on a network metering system.

In a network metering configuration, if accounting for funds is summarized by a user, transactions could be logged where the user is located. This would require consolidating log files only if the user has more than one PC at which transactions can be initiated, i.e., the user moves between PCs). This method uses decentralized accounting, logging transactions on the user's PC.

If accounting for funds is summarized by a meter, transactions should be logged where the meter, i.e. the PSD, is located. This would require consolidating log files only if the PSD could be attached to any PC (PSD moves between PCs). This method uses decentralized accounting, logging transactions on the PSD's PC.

If accounting for funds is summarized by department (i.e. departments have several users that can access several PSDs), transactions must be consolidated if the logging of transactions was performed where the user is located or where the PSD is located.

An alternative to such consolidation of log files from PCs is a centralized accounting and logging of all transactions on same PC or a centralized server. Transactions would have to be sent to the Network Server PC for every mail piece, producing heavy network traffic. If the centralized server is down, or otherwise not available, then no postage dispensing or refills can occur, disabling metering capabilities over the entire network. A centralized server for Network PC Metering System is not the preferred embodiment of the present invention.

Network PC Metering Systems 10 and 10' are representative of distributed processing of the metering transaction. Network PC Metering System 10 involves local transaction processing requested by a requesting Client PC 20, and remote accounting and logging at the Meter Server PC 21, i.e., where the PSD 40 and transaction log file 44 are located. Network PC Metering System 10' involves local transaction processing by the requesting Client PC 20, remote accounting at the Meter Server PC 21, i.e., where the PSD 40 is located, and remote logging at the Network Server 30, i.e. where transaction log file 44 is located. Thus, the transaction processing is split from the accounting functionality in distributed processing. The steps of the transaction are split between different PCs of the network.

There is an advantage to configuring network metering for distributed processing, such as In Network PC Metering Systems 10 and 10'. If Network Server 30 is down, metering transactions may still be performed when Client PCs having PSDs coupled thereto operate in stand-alone mode. Furthermore, network-metering transactions may be performed even when a Client PC 20 with a PSD attached thereto is not logged on the network. For example, the Client PC not logged on the network can operate in stand-alone mode, and the Client PCs logged on the network can access other Client PCs having PSDs coupled thereto.

When a Client PC is attempting to access remote PSDs on the network, an optional prioritized list of available PSDs can be displayed to the user for selection. The prioritized ordering of the available PSDs may use the following heuristics:

1. PSDs sharing the same ZIP as the originating address of the mailpiece
2. Local PSDs (same location as the Client PC)
3. Remote PSDs sharing the same origin ZIP as the local PSDs
4. PSDs having the same three digit ZIP as items 1–3
5. Remaining PSDs The preferred embodiment of the present invention has been described based on a Windows operating system for the Client computers. It will be understood that the present invention is suitable for use with any computer operating system. It will further be understood that although the embodiments of the present invention are described as postage metering systems, the present invention is applicable to any value metering system that includes transaction evidencing, such as monetary transactions, item transactions and information transactions.

Figure 7:
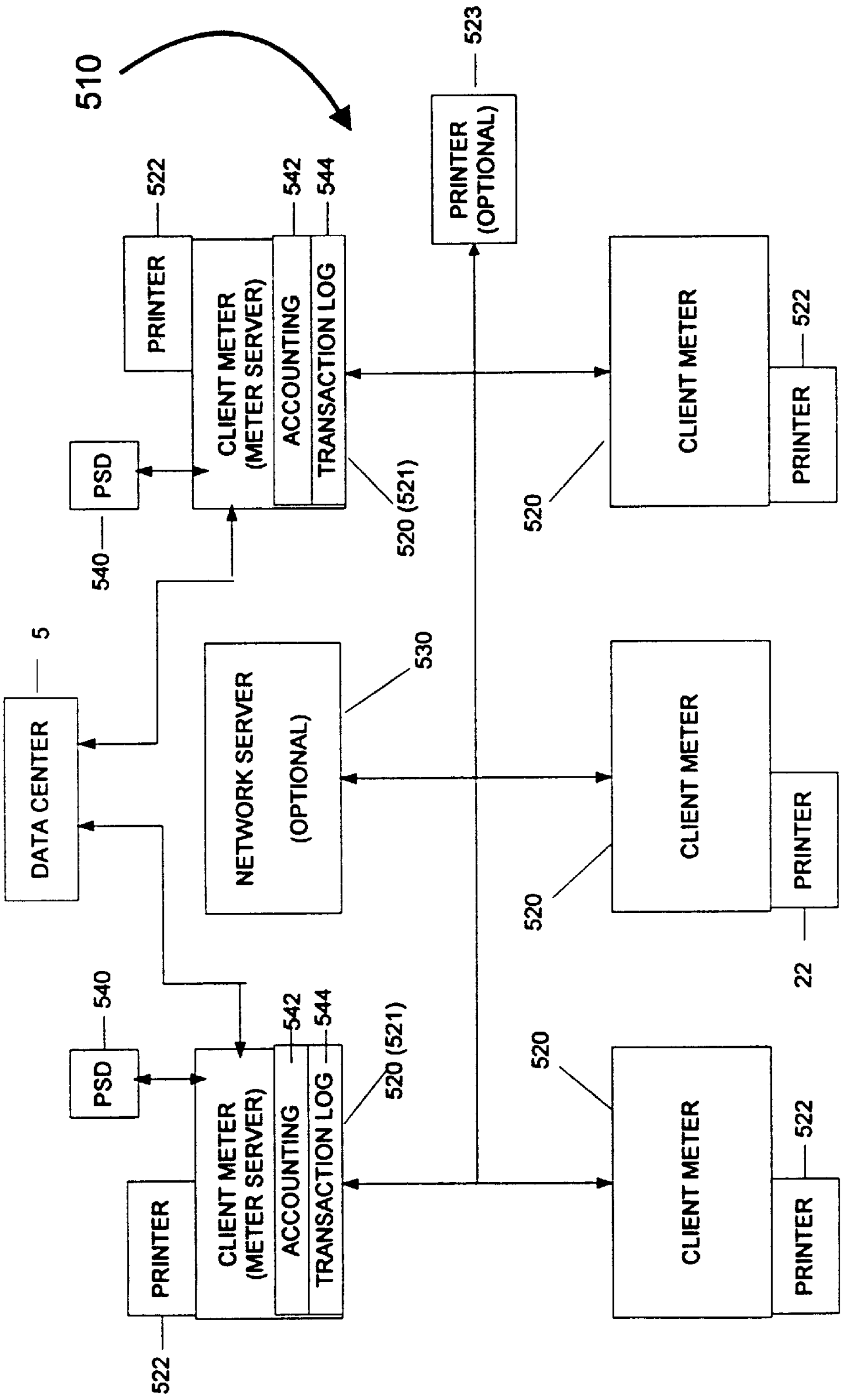
FIG. 7 is a block diagram of a closed system metering network in accordance with the present invention.

The preferred embodiment has been described for an open system metering network. It will be understood that the present invention applies also to a closed system metering network wherein digital postage meters are used in place of the Client PCs described in the preferred embodiment. Such a closed system metering network is shown in FIG. 7. A Network Metering System, generally designated 510, includes a plurality (five are shown) of Client modules 520 conventionally coupled to a Network Server 530, such as a personal computer. The Client modules are digital printers that are dedicated to printing postage indicium. Each Client module resembles a conventional digital metering system with optional display, keyboard, and an printer 522, however, some of the Client modules do not have an accounting module or PSD attached thereto. Preferably, a plurality of PSDs 540 (two are shown) exists in Network Metering System 510, with at least one PSD 40 being coupled to several Client modules 20. The PSDs 540 are accounting modules similar to accounting units in conventional electronic postage meters. When a specific PSD 540 is accessed for a metering transaction, the Client module 520, to which the PSD 40 is attached, becomes a Meter Server 521 (shown within parenthesis) for the remainder of the transaction. When the PSD 540 is being accessed by the Client module 520 to which the PSD is coupled the Client module 520 is functioning as a conventional meter. Client modules 520 communicate with Data Center 5 to refill local PSDs 540 and to access virtual PSD funds. A more detailed description of a closed system metering network is provided in previously noted related U.S. patent application Ser. No. E-648, which is incorporated herein by reference.

The present invention has been described for credit locking meters, i.e. those with ascending and descending registers, commonly referred to as prepayment systems. It is noted, however, that the present invention is also suitable for use with current account register systems, i.e., those with only an ascending register, commonly referred to as postpayment systems.

While the present invention has been disclosed and described with reference to the embodiments thereof, it will be apparent, as noted above, that variations and modifications may be made therein. It is, thus, intended in the following claims to cover each variation and modification that falls within the true spirit and scope of the present invention.

Windows 95 and Windows NT are trademarks of Microsoft Corporation.

What is claimed is:

1. A postage metering system comprising:

a plurality of processors operatively connected as part of a network and operating as client processors; on the network, the client processors including memory and storage means;

a postal security device coupled to a local one of the client processors the postal security device including unique identification, first postal value storage means and first digital signature means;

means in the client processors for functioning as a postage metering network wherein one of the client processors remote to the postal security device initiates a first request for first evidence of postage payment from the postal security device through the local one of the client processors for concluding postage metering transactions; and means in the local one of the client processors for connecting to a remote data center to obtain second evidence of postage payment from the remote data center.

2. The postage metering system of claim 1 wherein the local one of the client processors comprises:

means for initiating a second request to the remote data center for the second evidence of postage payment to be printed by the local one of the client processors;

means for receiving the first request from said one of the remote the client processors, the first request including identification of the remote client processor;

means for sending the first request to the postal security device;

means for receiving from the postal security device the first evidence of postage payment including a digital signature corresponding to the first evidence of postage payment;

means for sending the first evidence of postage payment to said one of the remote the client processors in response to the first request; and means for printing the second evidence of postage payment received in response to the second request.

3. The postage metering system of claim 2 wherein the local one of the client processors further comprises:

means for storing transactional information relating to the second and third evidences of postage payment.

4. The postage metering system of claim 2 wherein the local one of the client processors determines whether said one of the remote client processors is authorized to request the first evidence of postage payment from the postal security device.

5. The postage metering system of claim 2 wherein the postal security device determines whether said one of the remote client processors is authorized to request the first evidence of postage payment from the postal security device.

6. The postage metering system of claim 1 wherein the local one of the client processors further comprises:

means for initiating a third request to one of the remote client processors for third evidence of postage payment to be printed at the local one of the client processors; and means for receiving the third evidence of postage payment from said one of the remote client processors wherein said local one of the client processors prints the third evidence of postage payment received in response to the third request.

7. The postage metering system of claim 6 wherein said one of the remote client processors is coupled to a remote postal security device which provides said third evidence of postage payment in response to said third request.

8. The postage metering system of claim 1 wherein the client processors are general purpose computers.

9. The postage metering system of claim 1 wherein at least some of the client processors are each coupled to a printer dedicated to printing postage evidencing.

10. The postage metering system of claim 1 wherein the data center determines whether the local one of the client processors is authorized to request the second evidence of postage payment.

11. The postage metering system of claim 1 wherein the postal security device generates the first evidence of postage payment including a first digital signature representing each transaction requested by the local one of the client processors from the postal security device.

12. The postage metering system of claim 11 wherein the data center includes second unique identification, second postal value storage means and second digital signature means.

13. The postage metering system of claim 12 wherein the data center generates the second evidence of postage payment including a second digital signature representing each transaction requested by the local one of the client processors to the data center.

14. A postage metering system comprising:

a plurality of general purpose computers (computers) operatively connected as part of a computer network and operating as client computers on the computer network, the client computers including processor, memory and storage means;

a postal security device coupled directly to a local one of the client computers the postal security device including unique identification, postal value storage means and digital signature means;

means in the client computers for functioning as a postage metering network wherein one of the client computers remote to the postal security device initiates a first request for first evidence of postage payment from the postal security device through the local one of the client computers for concluding postage metering transactions; and means in the local one of the client computers for connecting to a remote data center to obtain second evidence of postage payment from the remote data center.

15. The postage metering system of claim 14 wherein the local one of the client computers comprises:

means for initiating a second request to the remote data center for the second evidence of postage payment to be printed at the local one of the client computers;

means for receiving the first request from one of the remote the client computers, the first request including identification of the remote client computers;

means for sending the first request to the postal security device;

means for receiving from the postal security device the first evidence of postage payment including a digital signature corresponding to the first request for evidence of postage payment;

means for sending the first evidence of postage payment to said one of the remote one of the client computers in response to the first request; and means for printing the second evidence of postage payment received in response to the second request.

16. The postage metering system of claim 15 wherein the local client computer further comprises:

means for storing transactional information relating to the second and third evidences of postage payment.

17. The postage metering system of claim 15 wherein the local one of the client computers determines whether said one of the remote client computers is authorized to request evidence of postage payment from the postal security device.

18. The postage metering system of claim 15 wherein the postal security device determines whether said one of the remote client computers is authorized to request evidence of postage payment from the postal security device.

19. The postage metering system of claim 14 wherein the local client computer further comprises:

means for initiating a third request to one of the remote client computers for third evidence of postage payment to be printed at the local client computer; and means for receiving the third evidence of postage payment from said one of the remote client computers wherein said local client computer prints the third evidence of postage payment received in response to the third request.

20. The postage metering system of claim 19 wherein said one of the remote client computers is coupled to a remote postal security device which provides said third evidence of postage payment in response to said third request.

21. The postage metering system of claim 14 wherein the data center determines whether the local client computer is authorized to request the second evidence of postage payment.

22. The postage metering system of claim 14 wherein the postal security device generates the first evidence of postage payment including a first digital signature representing each transaction requested by the local one of the client computers from the postal security device.

23. The postage metering system of claim 14 wherein the data center includes second unique identification, second postal value storage means and second digital signature means.

24. A transaction evidencing system comprising:

a plurality of general purpose computers (computers) operatively connected as part of a computer network and operating as client computers on the computer network, the client computers including processor, memory and storage means, and at least some of the client computers including transaction evidencing software that selectively runs on the client computers;

a transaction security device coupled to a local one of the client computers; the transaction security device including unique identification, transaction evidencing storage means, digital signature means, and transaction accounting means;

means in the client computers for functioning as a transaction evidencing network wherein one of the client computers remote to the transaction security device initiates a first request for first transaction evidence from the transaction security device through the local one of the client computers for concluding transaction evidencing transactions; and means in the local one of the client computers for connecting to a remote data center to obtain second transaction evidence from the remote data center, the local one of the client computers including:

means for initiating a second request for transaction evidence to be printed by the local one of the client computers;

means for receiving the first request for transaction evidence from said one of the remote client computers, the request including identification of the remote client computer;

means for sending the first request to the transaction security device;

means for receiving from the transaction security device the first transaction evidence including a digital signature corresponding to the first transaction evidence;

means for sending the first transaction evidence to said one of the remote client computers in response to the first request; and means for printing the second transaction evidencing in response to the second request.

25. A method for postage metering, the method comprising the steps of:

providing a plurality of client modules on a network;

coupling a local postage security device to a first one of said client modules and a remote postal security device to a second one of said client modules, the local and remote postal security devices including respectively first and second unique identification, postal value storage means and digital signature means;

providing means for said first client module to communicate with a remote data center, the remote data center including third unique identification, third postal value storage means and third digital signature means;

selectively requesting at said first client module one of a first evidence of postage payment from the local postal security device, a second evidence of postage payment from the remote postal security device and a third evidence of postage payment from the data center; and printing the selected one of the first, second and third evidences of postage payment on a mailpiece.

* * * * *